United States Patent
Somma et al.

[15] 3,636,805
[45] Jan. 25, 1972

[54] SINGLE-SETTING TURNING TOOL

[72] Inventors: Henry J. Somma; Herman R. Somma, both of Waterbury, Conn.

[73] Assignee: Somma Tool Company, Inc., Waterbury, Conn.

[22] Filed: Sept. 30, 1969

[21] Appl. No.: 862,370

[52] U.S. Cl. ................................................82/35
[51] Int. Cl. ..............................................B23b 29/16
[58] Field of Search ................................................82/35

[56] References Cited

UNITED STATES PATENTS

| 1,020,495 | 3/1912 | Hartness | 82/35 |
|---|---|---|---|
| 1,228,570 | 6/1917 | Kupp | 82/35 |
| 3,000,247 | 9/1961 | Saunders | 82/35 |
| 3,309,951 | 3/1967 | Patt | 82/35 |
| 3,385,146 | 5/1968 | Head | 82/35 |

FOREIGN PATENTS OR APPLICATIONS

| 525,077 | 8/1940 | Great Britain | 82/35 |

*Primary Examiner*—Leonidas Vlachos
*Attorney*—Mandeville and Schweitzer

[57] ABSTRACT

The invention is directed to a turning tool, particularly for automatic screw machines, which includes novel features of design and construction facilitating the initial step-up of the tool and also its adjustment in use. One of the inventive features includes the arrangement for effecting simultaneous inward or outward adjustment of a cutting tool and two backup elements associated therewith, and at the same time, providing a simplified independent adjustment of the cutting tool, through a limited range, where it is desired to burnish the workpiece while it is being cut. The burnishing effect is achieved by the manipulation of a special control lever, which adjusts the cutting element without affecting the other adjusted settings of the tool, and manipulation of the lever back to its original position resets the tool for cutting in the normal way. The device includes a novel chip breaker element, adjustably mounted on the tool body and having a first operative position in which it forms a center setting stop for the cutting tool, and a second operative position in which it functions in its customary manner as a chip breaker during the cutting operation. The new turning tool also has additional desirable features for improved convenience in use and greater accuracy in cutting.

6 Claims, 8 Drawing Figures

*INVENTOR.*
HERMAN R. SOMMA

BY
Mandeville & Schwaitzer
ATTORNEYS

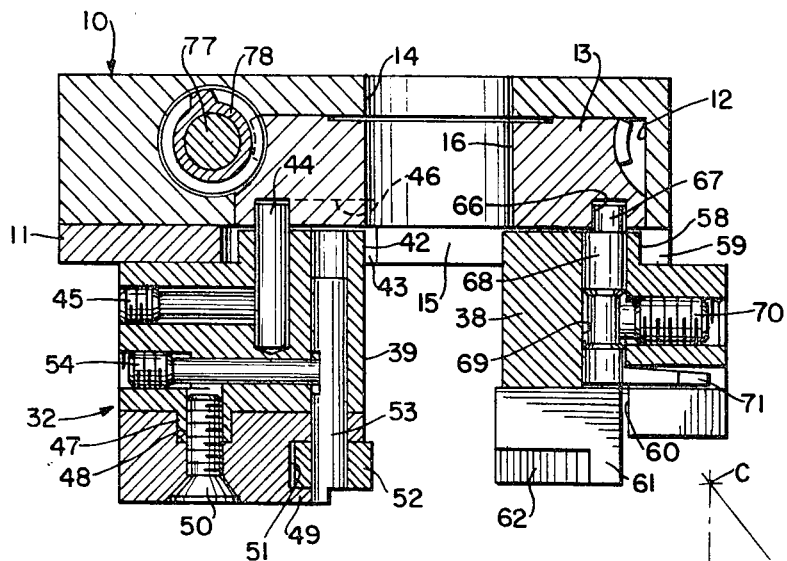
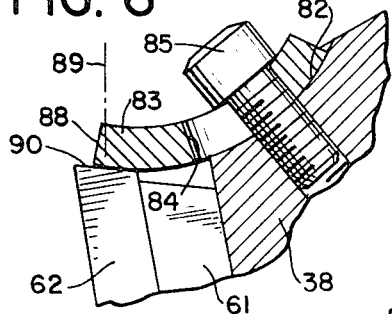
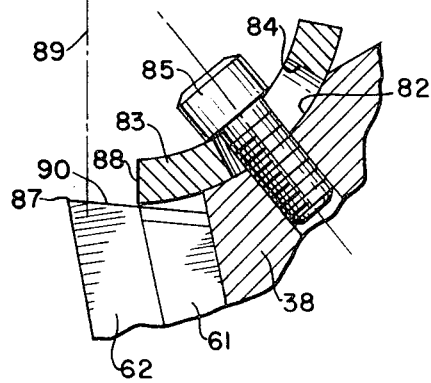
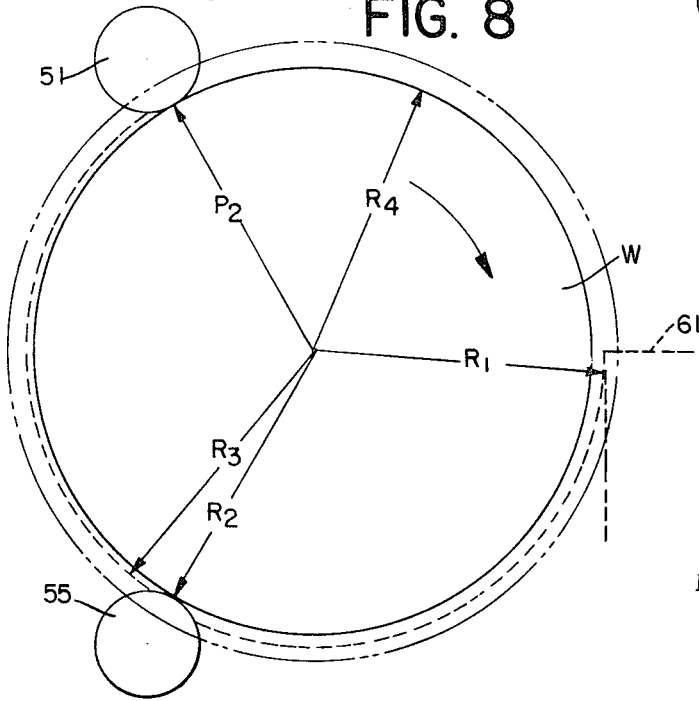

SINGLE-SETTING TURNING TOOL

SUMMARY AND BACKGROUND OF INVENTION

The invention relates to turning tools for automatic screw machines and the like. Typically, and in the present case, such tools are mounted on the turret of a screw machine, aligned with the axis of the workpiece held in a rotating collet of the machine, and the cutting tool is advanced longitudinally, along the axis of the workpiece to make a cut on the diameter thereof. The turning tool is a more or less self-contained unit, including a cutting bar or tool, backrest rollers or elements, and means for effecting radial adjustment of the cutting tool and backrest elements. Particularly in automatic screw machine work, where the workpiece being turned typically may be quite small, operating conditions are quite severe, and precision tolerances may be required, it has been conventional to provide for independent adjustment of the cutting tool and the backup rollers to achieve a desired three-point contact with the workpiece, taking into account any misalignment in the machine. In practice, such independent, three-point adjustment always has proven to be difficult and painstaking, and often is imperfectly achieved, resulting in undesirable deflection of the workpiece during cutting. Thus, the conventional device is both difficult and time consuming to set up, and frequently is imperfect in its operation as a result of the difficulty in accomplishing the original alignment and settings.

In accordance with one of the important features of the invention, a novel and improved turning tool is provided, for automatic screw machines and the like, which includes, in combination, a floating mount, for securing the turning tool to the screw machine turret, and a single adjustment facility for effecting simultaneous radial inward or outward adjustment of the cutting and backup elements. With the new arrangement, not only is the setup and adjustment of the turning tool greatly facilitated and expedited, but the desired precision of the final adjustment is much more readily achieved and retained, and undesirable conditions such as workpiece deflection are avoided. With the single setting turning tool of the invention, the cutting bar and backup rollers may be simultaneously adjusted inward into three-point concentric contact with the workpiece, while the tool body is retained in "floating" relationship with the screw machine turret. Thus, the tool assembly may be precisely centered relative to the workpiece, regardless of misalignment between the workpiece collet and the screw machine turret. The tool body then may be tightly secured to its floating mount, retaining all the critical elements in precise alignment with the workpiece axis. Thereafter, the assembly may be adjusted to any desired cutting diameter by means of a single, precision adjustment facility, desirably a worm gear mechanism, which will simultaneously move the three principle working elements of the assembly inward or outward, as the case may be, along a radial axis extending from the centerline of the workpiece.

In automatic machine screw work, there is frequent need for burnishing of the cut surface of the workpiece to improve its appearance. Typically, this is accomplished by setting the backup rollers of the tool to run on a diameter slightly smaller than the diameter on which the cut is being made by the closing cutting element. The need for such independent setting of the backup rollers perhaps has contributed to the continued retention in prior art devices of independent, three-point adjustment of the turning tool elements. In the improved turning tool assembly of the present invention, however, the necessary burnishing action is provided for, while still retaining the single-setting adjustment feature of the device. This desirable result is achieved by providing, in the mechanical adjustment train for the cutting tool, an eccentric lever which may be manipulated to effect radial retraction of the cutting tool element, relative to the backup rollers, without disengaging the cutting tool from its principle single-setting adjustment mechanism. When it is desired to set the turning tool assembly for burnishing operation, this eccentric lever is moved to its "burnishing" position, which independently backs off the cutting tool a short distance, say up to about 0.008 inch. As the cutting operation subsequently proceeds, the backup rollers, being set on a smaller diameter than the cutting tool, apply burnishing pressure to the cut surface in the desired manner.

In accordance with a further aspect of the invention, the novel turning tool assembly includes a chip breaker facility, which is so designed and constructed as to be useful in an additional capacity, as a centering stop for the cutting tool. Conventionally, the chip breaker element presents an abutment-like surface adjacent the cutting edge of the tool, in a position to prevent the continuous spiral formation of the cut material. The cut material thus breaks into the smaller chips, which are easily washed away by the cutting fluid and are easily handled and disposed of. In the device of the present invention, the chip breaker element has an advantageous, arcuate form and is adjustably secured in the tool holder block of the device. The range of adjustment provided is in excess of that needed for chip-breaking action, and a limit position is provided in which the chip breaker element may be extended forward over the cutting element and into tangential relation therewith. When the chip breaker element is in its thus-extended position, the cutting element may be inserted in the tool holder and pressed against the extended chip breaker element to precisely center the cutting edge with the axis of the tool. The cutting element may then be locked in place, and the chip breaker may be then retracted to its normal, chip-breaking position.

For a better understanding of the invention, and a description of the above and other advantageous features thereof, reference should be made to the following detailed description and to the accompanying drawings.

DESCRIPTION OF THE DRAWINGS

FIG. 5 is a cross-sectional view taken generally along line 5—5 of FIG. 3.

FIGS. 6 and 7 are greatly enlarged, fragmentary views illustrating a novel chip breaker element incorporated in the device of FIG. 1, showing the chip breaker in its respective operating positions for center setting of the cutting element and for chip breaking.

FIG. 8 is a simplified, schematic representation illustrating the action of the turning tool assembly of FIG. 1, when the tool is set for burnishing action.

DESCRIPTION OF PREFERRED EMBODIMENT

Figure 1:
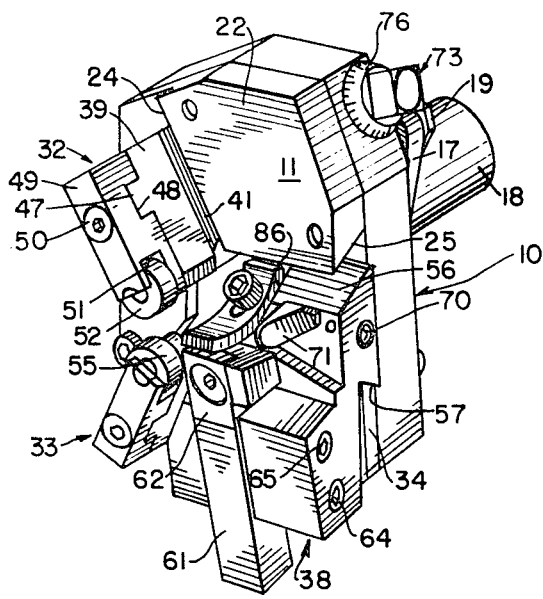
FIG. 1 is a perspective view of a single-setting turning tool constructed in accordance with the principles of the invention.

Referring now to the drawing, the reference numeral 10 designates generally a tool body section or block, which either houses or mounts the principle elements of the turning tool assembly. The body block 10 has secured to its front face a cover plate 11 which encloses a large cylindrical recess 12 formed in the block. A scroll gear 13 is closely received and confined within the body block recess 12 and is arranged for rotational movement therein, as will be described in more detail hereinafter. The body block 10, the cover plate 11, and the scroll gear 13 are formed with central openings 14, 15, 16 (see FIG. 5) to accommodate the passage through the assembly of a workpiece.

Figure 2:
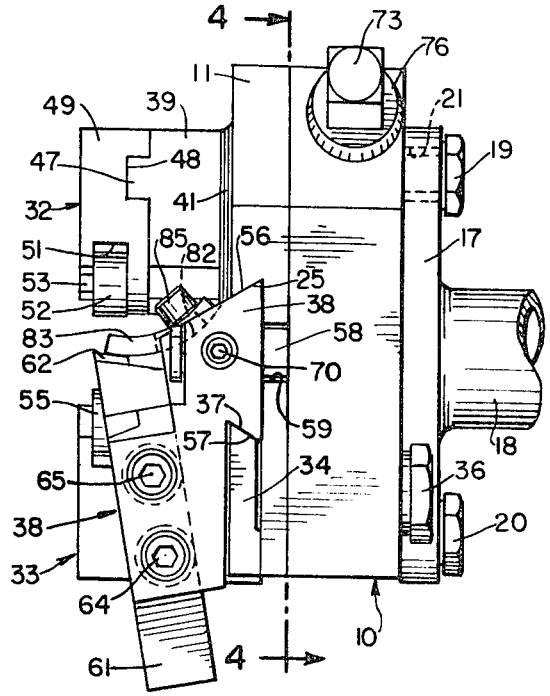
FIG. 2 is an enlarged, side-elevational view of the single-setting turning tool of FIG. 1.

A mounting bracket 17, incorporating a hollow shank 18, is secured to the rear face of the body block 10 by means of bolts 19, 20. Typically, two bolts may be sufficient, although more may be used if desired. The bolts 19 are tapped into the body block 10 and are received in opening 21 which are of greater diameter than the diameter of the bolts 19, 20, as illustrated in FIG. 2. This provides for a limited degree of universal lateral adjustment of the body block 10 and the remainder of the tool assembly relative to the mounting bracket 17 to compensate for machine misalignment, as will be described hereinafter.

In the illustrated form of the invention, the cover plate 11 includes integral, machined-in guide block sections 22, 23, which are formed to provide dovetail guide surfaces 24–26. A separate guide block section 27, secured to the face of the cover plate 11 by bolts 28, 29, is machined to form dovetail guide surfaces 30, 31, cooperating respectively with the guide surfaces 24, 26 to form radial guide passages for roller slide blocks 32, 33. An additional separate block 34 is suitably secured to the cover 11 and body block 10, as by means of locating pins 35 and a bolt 35 (see FIG. 4). The block 34 is machined to provide a dovetail guide surface 37 arranged to cooperate with the guide surface 25 to form a radial guide passage for a tool holder slide block generally designated by the numeral 38. Thus, in general, the cover plate 11 and the separate guide blocks 27, 34 cooperate to form the three radially disposed guide passages for the slide blocks 32, 33, and 38. Desirably, the three radially disposed guide passages are oriented in a generally symmetrical manner, with approximately 120° of angular separation between each of the respective guide channels, providing for symmetrical three-point contact between the working parts of the device and the workpiece being machined thereby.

Figure 3:
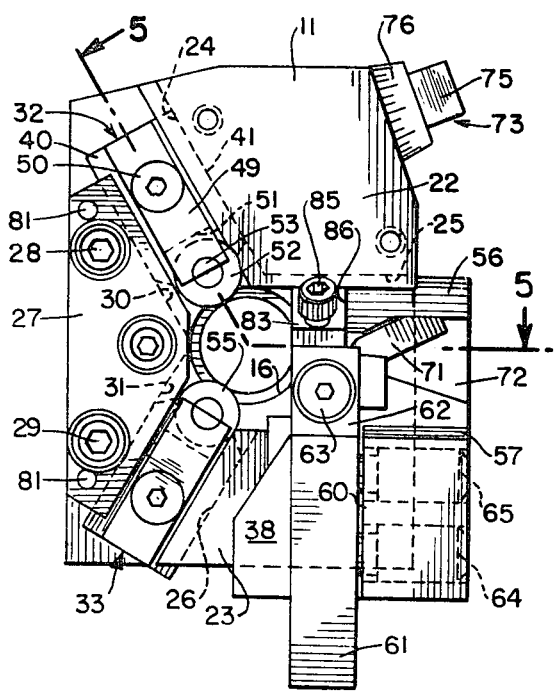
FIG. 3 is a front-elevational view of the turning tool of FIG. 1.

In the illustrated form of the invention, the slide blocks 32, 33 are of two-part construction. Thus, as reflected in FIG. 5, the slide block 32 comprises a mounting block 39 which is provided with outwardly flaring, dovetail guide surfaces 40, 41 (see FIG. 3) and a guide boss 42 which extends into a radial slot 43 in the cover plate 11. The mounting block 39 has a drive pin 44, received therein and locked by a setscrew 45; the pin extends in an axial direction into a spiral slot 46 (FIG. 4) in the scroll gear 13. The arrangement is such that, as the scroll gear is rotated through its operative arc, the pin 44 will be carried radially inward or outward, as the case may be, by the spiral slot 46.

The mounting block 39 is provided on its forward surface with a transverse locating boss 47 which is received in a corresponding groove 48 in a backrest block 49. The backrest block 49 is secured to the mounting block 39 by means of a suitable screw 50 and is mechanically locked with the mounting block by means of the locating boss 47. The backrest block 49 is provided with a recess 51 in which is received a backrest roller 52, formed of a suitable wear-resisting material. The backrest roller 52 is mounted by means of a roller pin 53 which extends through the backrest block 49 and into the mounting block 39, to lock these two parts in precisely aligned relation. The pin is secured in place by means of a setscrew 54. As shown in FIG. 5, the backrest roller 52 projects slightly radially inward of the innermost extremity of the slide block assembly 32, so as to be able to have contact with a workpiece.

As will be understood, the slide block 33, carrying backrest roller 55, is of similar construction to the slide block 32. Also, where desired, carbide V-type backrests may be utilized in place of roller backrests.

Slidably guided between the dovetail guide surfaces 25, 37, is the tool slide block 38, which includes dovetailed guide surfaces 56, 57 (see FIG. 3) and a projecting guide boss 58 (FIG. 5) which is received in a guide slot 59 in the cover plate 11. The tool slide block 38 has a recess 60 machined therein for the reception of a cutting tool 61. As viewed in the front elevation, the recess 60 desirably is vertically disposed while, as viewed in side elevation, (e.g., FIG. 2) the recess is angled somewhat upward and forward, to provide a desired clearance angle for the tool 61. In the illustration of the present application, the cutting tool 61 is provided with a tungsten carbide cutting edge insert 62, secured by a screw 63, although a cutting tool 61 formed entirely of suitable high-speed tool steel is adequate for most purposes. A pair of recessed setscrews 64, 65 provided in the tool slide block are adapted to bear against the side of the cutting tool 61 and lock it in its preadjusted position in the block.

In accordance with one aspect of the invention, the tool slide block 38 is drivingly connected to a spiral slot 66 in the scroll gear 13, by means of an eccentric pin 67. The body 68 of the eccentric pin is journaled in a bore 69 in the tool slide block, and is both located therein and adapted to be locked against rotation by means of a setscrew 70. At the exposed, forward end of the pin body 68, there is a manipulating lever 71, which is received within a recess 72 machined into the front face of the tool slide block 38. The arrangement is such that, when the setscrew is slightly loosened, the lever 71 may be rotated through its operative excursion (typically about 45°), or any fractional part thereof. In the illustrated arrangement, when the lever 71, which may be descriptively referred to as the burnishing lever, is rotated to its uppermost limit position, as shown in FIG. 1, the eccentric pin 66 is located relatively radially outward, with respect to the body 68 of the pin. If the lever 71 subsequently is rotated in a downward direction, without any change in the position of the scroll gear 13, the tool slide block 38 will be caused to move in a radially outward direction, a distance related to the total eccentricity of the pin 67. In a typical single-setting turning tool assembly according to the invention, a maximum "throw" or travel of on the order of 0.008 to 0.010 inch of the tool slide block 38, in response to a full excursion of the burnishing lever 71, usually is sufficient. It will be understood, of course, that the burnishing adjustment may be anything less than the maximum throw provided, simply by providing for adjustment of the burnishing lever 71 through less than its entire excursion, and locking it in place with the setscrew 70.

Figure 4:
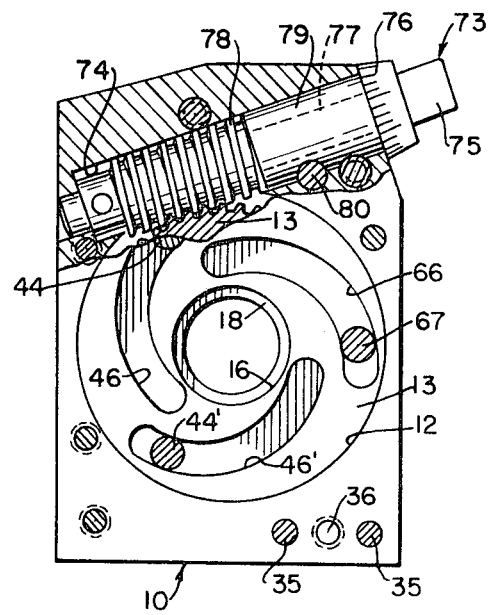
FIG. 4 is a cross-sectional view taken generally along line 4—4 of FIG. 2, with additional parts being broken away to illustrate the adjustment mechanism of the turning tool of FIG. 1.

As shown in FIG. 4, the scroll gear 13 is provided with three symmetrical spiral grooves 46, 46' and 66. The groove 46' cooperates with a pin 44 to provide a driving connection between the backrest slide block 33 and the scroll gear, substantially identical to that provided for the backrest slide block 32.

Controlled adjustment of the slide blocks 32, 33 and 38, simultaneously in a radially inward or outward direction, is effected by controlled rotation of the scroll gear 13. Most advantageously, this is brought about by means of a worm gear adjusting element 73, which is rotatably journaled in a recess 74 in the body block 10. Desirably, the adjusting element 73 includes a wrench flat 75, a calibrated dial 76, a shaft portion 77 and a worm gear 78. The element 73 is retained in the recess 74 by means of a cylindrical bushing 79, which is locked into the body block by means of a locating pin 80. As will be understood, rotation of the adjusting element 73 will effect controlled rotary movement of the scroll gear 13. By means of the inclined cam surfaces presented by the spiral slots 46, 46' and 66, the pins 44, 44' and 67 will be advanced or retracted in a radial direction, in a precisely controlled manner. Desirably, the worm gear relationship between the element 73 and the scroll gear 13 provides for a very large movement of the element 73, in relation to movements of the slide blocks 32, 33 and 38, so that adjustment of the device is sensitive and precise.

In view of the severity of the working conditions under which the turning tool typically will be utilized, it is desirable to lock the device after adjustment. To this end, the backrest slide blocks 32, 33, may be locked in place by tightening the screws 28, 29, by which the guide block 27 is secured to the cover plate 11 and body block 10. In this respect, the guide block 27, which may be positioned in the assembly by means of locating pins 81, is so dimensioned that, when it is tightly secured against the cover plate 11, it bears tightly against the dovetailed surfaces of the slide blocks 32, 33, firmly locking the blocks in their adjusted positions. Likewise, the guide block 34 is secured in place by the bolt 36 which extends through the body block 10 and cover plate 11 from the back.

The guide block 34 is dimensioned so that when it is secured tightly in place, it grips the dovetailed guide surfaces of the tool slide block 38 to lock it in its adjusted position.

As will be observed, in the device of the invention, the cover plate 11 is constructed to provide one of the guide surfaces for each of the slide blocks 32, 33 and 38, so that the guiding accuracy of the device is rigidly maintained. In addition, the guide surfaces 24, 26 provided on the cover plate 11 for the slide blocks 32, 33, respectively are so disposed (outwardly facing with an included angle of 120° across the open side) that a single guide block 27 may be utilized to provide the opposing guide surfaces for both slide blocks 32, 33. This not only improves the accuracy of the device, but further simplifies the setup adjustments, because both of the slide blocks 32, 33, are locked in place by tightening of the single guide block 27.

In accordance with another specific feature of the invention, the tool slide block 38 is provided, in a region generally directly above the tool-receiving recess 60, with an arcuate seat 82 (FIGS. 2, 6, 7). The seat 82 faces forward and upward and serves to slidably support an arcuately shaped chip breaker element 83. The chip breaker 83 is provided with an elongated slot 84 receiving a locking screw 85 engaged in the slide block 38. Thus, the chip breaker element 83 may be adjusted through the arcuate path, within the limits of the elongated slot 84, and locked in its adjusted position by the screw 85. The chip breaker is additionally guided along the side, by a projecting side shoulder 86, forming the sidewall of the arcuate recess 82.

In accordance with the invention, the center of curvature "C" of the arcuate seat 82 and chip breaker 83 is located generally above and just slightly to the rear of the uppermost and forwardmost extremity 87 of the cutting tool 61 (see FIG. 7). Moreover, the forward limit of adjustment of the chip breaker 83 desirably is such that the forward extremity 88 thereof may be advanced slightly forward of the vertical radius line 89, extending from the center of curvature "C." Thus, taking into consideration the slight downward rake angle of the upper surface 90 of the cutting tool, the arcuate chip breaker 83 may be brought into tangent contact with the upper surface 90 of the tool, usually at a point slightly forward of the vertical radius line 89, when the chip breaker is adjusted to its maximum forward extended position, as shown in FIG. 6.

In accordance with the invention, the proportioning of the chip breaker, its arcuate seat 82, cutting tool 90 and other parts of the assembly are such that, when the chip breaker is advanced to its extended position and tightly locked therein by the screw 85, the tip 87 of the cutting tool 61 may be adjusted precisely to the centerline of the turning tool assembly, by advancing the cutting tool 61 upward in its recess 60 until it engages and is stopped by the projecting portion of the chip breaker 83. This precise alignment of the cutting tool 61, is of course, essential when a new cutting tool is inserted in the assembly, and also when a cutting tool is replaced after sharpening.

After initial centering of the cutting tool 61, and its being locked in place by the setscrews 64, 65, the chip breaker 83 may be relocated, as shown in FIG. 7, to a position in which optimum chip-breaking action is realized. This, of course, will depend much on the nature of the material being cut, the depth and width of the cut, etc., and a substantial range of adjustment in the chip breaker is provided by means of the slot 84 to enable the best action to be achieved under foreseeable conditions.

SUMMARY OF OPERATION

The single-setting turning tool of the invention typically is utilized in an automatic screw machine apparatus. When the turning tool is to be utilized in such an apparatus, a typical first step would be to secure the mounting shank 18 in the machine turret, with the mounting screws 19, 20 loosely attaching the flange 17 to the tool body block 10. Then, with the workpiece properly centered in and gripped by the machine collet, the tool slide or turret is advanced to a position in which the workpiece is embraced by the backup rollers 51, 55 and the cutting tool 61. The cutting tool 61 previously will have been precisely centered in the turning tool assembly by being moved against the extended chip breaker element 83, as described in the preceding paragraphs.

When initially applied over the workpiece, the turning tool assembly will have been "opened" sufficiently to be readily received over the exterior of the piece. Thereafter, it may be closed down by manipulation by the single adjusting element 73, to rotate the scroll gear 13 in a clockwise direction as viewed in FIG. 4, effecting simultaneous and precisely equal radial inward adjustment of the backing rollers 51, 55 and the cutting element 61. As all three of these elements are brought into light contact with the workpiece, the principle elements of the turning tool will be precisely centered with respect to the axis of the tool and of the workpiece. If there is any misalignment between the axis of the machine collet and workpiece and the axis of the tool slide, as frequently may be encountered, the eccentricity of alignment is automatically compensated for by a lateral shifting of the body block 10 relative to the mounting flange 17, accommodated by the oversize holes 21 and the still-loosened mounting bolts 19, 20. At this time, the bolts 19, 20 may be tightened, to lock the mounting flange and the body block 10 together and secure the turning tool in precise alignment with the work.

If the work is not to be burnished, setting of the tool for the desired cutting operation is accomplished simply by manipulation of the adjusting element 73, the locking bolts 28, 29 and 36 being initially loosened to accommodate the necessary movement of the slide blocks 32, 33 and 38. When the desired cutting diameter is reached, the entire assembly is locked by tightening the screws 28, 29, and 36. The chip breaker is adjusted for optimum chip-breaking action, and the tool is then ready to be operated.

Initial setup of the turning tool as above described, is quick and efficient, and extremely precise adjustment may be realized. An especially high quality of output may be achieved, considering both surface effects and tolerances, since workpiece deflections and other distortions, commonly experienced when separate adjustment of the three slide blocks is required, is reliably avoided.

Where it is desired to burnish the surface of the cut workpiece, a preliminary adjustment may be made, in the manner above described. Then, the locking screw 70 may be loosened slightly, permitting downward pivoting of the burnishing lever 71 throughout all or some desired portion of its operative excursion. Because of the eccentricity of the connecting pin 67, this pivoting action of the burnishing lever functions to effect radial retraction of the tool slide block 38 independently of the backing roller slide blocks 32, 33. The adjusted position of the burnishing lever 71 is determined for the desired burnishing effects, and it is locked in place by retightening of the setscrew 70. Thereafter, the turning tool may be readjusted radially inward slightly, to partly or entirely compensate for the independent radial retraction of the cutting tool. In the compensating adjustment, of course, the backing rollers 51, 55 are advanced radially inward along with the cutting tool.

The burnishing action of the device is illustrated in FIG. 8. It is there indicated that, by reason of the burnishing adjustment, the cutting tool 61 is set on a nominal radius $R_1$ which is slightly greater than the nominal radius $R_2$ on which the backup rollers 51, 55 are set. The difference between the radii $R_1$ and $R_2$ is entirely a function of the manipulation of the burnishing lever 71.

As the workpiece W turns within the cutting area of the tool, it is turned substantially to the radius $R_1$ by the cutting action of the cutting element 61. As the workpiece then continues to rotate through a 120° arc, the newly cut surface encounters the first backup roller 55, which is set on a smaller nominal radius $R_2$. As the work passes under the first backup roller 55, it is subjected to substantial pressure and formation and emerges on the other side of the roller at a reduced radius $R_3$. Upon continued rotation of the workpiece for an additional 120°, it encounters the second backup roller 51, also set at the nominal radius $R_2$. The intermediate radius $R_3$ of the workpiece at this stage still is in excess of the radius $R_2$, so that work is again deformed and subjected to pressure in passing under the second backup roller 51. The finished work emerges on a burnished radius $R_4$, which may substantially approach, but typically will be slightly larger than the nominal radius $R_2$ on which the backup rollers 51 initially are set. It will be understood, of course, that in a conventional screw machine operation, the cutting of the workpiece typically is occurring in close-coupled relation to the workpiece-holding collet. This close-coupled relationship provides a measure of support for the workpiece to avoid undue deflection during the burnishing operation.

One of the important advantages of the new turning tool assembly is the significant reduction in adjustment or setup time which can be realized through its use. Heretofore, it has been necessary, at least initially, to effect separate initial adjustment of the cutting element and individual backing rollers of a three-element assembly. An adjustment of this type is not only time consuming and difficult, but it is frequently imprecise and results in inferior work output. The device of the present invention, combining a simultaneous adjustment of the three working elements of the tool, with a floating mount for the tool body, enables all of the necessary adjustments to be made in an extremely expeditious manner and with greater precision than otherwise might be realized.

With the new device, even a burnishing effect may be achieved with what is still, in effect, a "single-setting" tool. Although burnishing is realized by, in effect, advancing the two backup rollers, the action is achieved with the new tool by independently backing off only the cutting tool, and then simultaneously advancing or closing down the cutting tool along with the two backup rollers. The desired independent retraction of the cutting tool is effected by means of an eccentric lever, which normally serves as a driving connection between an adjustment scroll gear and the tool slide, but which additionally functions upon rotational movement of the pin to effect the desired independent control of the cutting tool itself.

The dual purpose chip-breaker-tool-setting facility of the new turning tool assembly further facilitates the initial setup of the tool by providing a rigid stop against which the cutting element may be placed for precise centering on the tool body. This precise setting is realized without utilizing exterior gauges or jigs and with little, if any, operations additional to those normally involved in the setting of the chip breaker after mounting of the cutting element in the tool.

Although the device of the invention is adapted for precise and delicate adjustment, it is at the same time, extremely rugged and durable, and of a generally simplified construction, so that tool maintenance is minimized.

It should be understood, of course, that the specific form of the invention herein illustrated and described is intended to be representative only, as certain changes may be made therein without departing from the clear teachings of the disclosure. By way of example only, the illustrated device may be readily adapted for either right-hand (as shown) or left-hand operation. Left-hand operation is enabled by substituting a tool slide block (not shown) in which the tool is inverted in relation to the position shown in FIG. 1. Accordingly, reference should be made to the following appended claims in determining the full scope of the invention.

I claim:

1. A single-setting turning tool assembly for screw machines and the like, comprising
   a. a body member,
   b. a mounting member secured to said body member for universal lateral adjustment and having means for mounting the tool assembly in a screw machine turret or the like,
   c. a plurality of tool elements, including a cutting element and a pair of associated backup elements, carried by said body member and adapted for radial inward and outward movement with respect to a predetermined tool axis,
   d. tool adjustment means in said body block engaging the several tool elements and operative to effect simultaneous inward or outward adjustment thereof,
   e. said backup elements having a fixed association with said tool adjustment means,
   f. independent adjustment means associating said cutting element with said tool adjustment means for effecting inward and outward adjustment of the cutting element independently of the backup elements,
   g. said tool adjustment means comprising a scroll gear received in and confined by said body member and having a spiral cam slot for each of said tool elements,
   h. guide means on the front face of said body member supporting said elements and guiding them for sliding movement in a radial direction with respect to the tool axis,
   i. drive pins connecting said backup elements to predetermined cam slots in said scroll gear and providing a predetermined adjustment association between said backup elements and the scroll gear, and
   j. an eccentric drive pin connecting the cutting element to a predetermined slot in the scroll gear and providing an independently adjustable association between said scroll gear and said cutting element.

2. A single-setting turning tool according to claim 1, further characterized by
   a. an operating lever connected to said eccentric pin and exposed for manual manipulation to rotate said eccentric pin, and
   b. means providing a limit stop for said lever, when said lever is moved to a position in which the cutting element and said backup elements are effectively equidistant from the tool axis.

3. A single-setting turning tool assembly for screw machines and the like, comprising
   a. a body member,
   b. a mounting member secured to said body member for universal lateral adjustment and having means for mounting the tool assembly in a screw machine turret or the like,
   c. a plurality of tool elements, including a cutting element and a pair of associated backup elements, carried by said body member and adapted for radial inward and outward movement with respect to a predetermined tool axis,
   d. tool adjustment means in said body block engaging the several tool elements and operative to effect simultaneous inward or outward adjustment thereof,
   e. said backup elements having a fixed association with said tool adjustment means,
   f. independent adjustment means associating said cutting element with said tool adjustment means for effecting inward and outward adjustment of the cutting element independently of the backup elements,
   g. said body member comprising a body block and having a cylindrical recess in the front face thereof,
   h. said tool adjustment means comprising a rotary element received in said recess and confined by said body block,
   i. a cover plate being secured to the front face of said body block and confining said rotary element in said recess,
   j. said cover plate having guide slots therein to receive said tool elements and guide them in movements radially off of the tool axis,
   k. said cover plate having a separate, integral, dovetail guide surface for each of the tool elements,
   l. independent guide block elements being secured to said cover plate and provided with dovetail guide surfaces for cooperation with the integral guide surfaces of said cover plate to provide dovetail guide slots for said tool elements, m. the integral guide surfaces for said backup elements facing generally toward the same side of the tool assembly and having a large included angle between them, n. a first independent guide block being secured to said cover plate in generally opposed relation to the last-mentioned integral guide surfaces and forms therewith the guide slots for both of said backup elements, and o. a second independent guide block being secured to the cover plate in opposing relation to the integral guide surface for said cutting element and forming with such integral guide surface a dovetail guide slot for the cutting element, p. said tool elements having slide blocks provided with dovetail guide elements for cooperation with the dovetail guide slots, q. said guide blocks being releasably secured to said cover plate, and r. said guide slots and guide elements being so proportioned that said slide blocks are clamped to said cover plate by tightly securing said independent guide blocks.

4. A single-setting turning tool assembly for screw machines and the like, comprising a. a tool body block, b. a mounting member secured to said body block for universal lateral adjustment and having means for mounting the tool assembly in a screw machine turret or the like, c. a cutting element and two backup elements carried at the forward face of said body block and guided for radial movement toward and away from a predetermined tool axis, d. said cutting and backup elements being guided for movement along mutually intersecting axes spaced substantially apart, e. a controllably movable tool adjustment member carried by said body block, f. preset means connecting said tool adjustment member to said backup element, and g. adjustable means connecting said cutting element to said tool adjustment member, h. said tool-adjusting member comprising a movable member having cam slot means therein, i. the preset connecting means comprising drive pins carried by said backup elements and projecting into slidable association with said cam slot means, and j. the adjustable connecting means comprising an eccentric drive pin carried by said cutting element and having an eccentric portion projecting into slidable association with said cam slot means.

5. A single-setting turning tool assembly for screw machines according to claim 4, further characterized by a. said eccentric drive pin having a rotatable control lever extending therefrom and adapted for manual engagement, b. means being provided on said cutting element limiting the rotational movement of the lever, at least in one direction, to provide for equidistant spacing of the backup and cutting elements from the point of intersection of said axes, and c. said lever being movable in the other direction to move the cutting element radially outward independently of said backup members.

6. A single-setting turning tool assembly for screw machines and the like, comprising a. a tool body block, b. a mounting member secured to said body block for universal lateral adjustment and having means for mounting the tool assembly in a screw machine turret or the like, c. a cutting element and two backup elements carried at the forward face of said body block and guided for radial movement toward and away from a predetermined tool axis, d. said cutting and backup elements being guided for movement along mutually intersecting axes spaced substantially apart, e. a controllably movable tool adjustment member carried by said body block, f. preset means connecting said tool adjustment member to said backup element, and g. adjustable means connecting said cutting element to said tool adjustment member, h. said cutting element comprising a slide block and a bar-like cutting tool, i. said slide block having a recess therein for the slidable reception and aligned support of the cutting tool, j. locking means being provided on said slide block for securing the cutting tool in an adjusted position therein, k. an adjustable chip-breaker element carried by said slide block and movable to a predetermined extended position and from said extended position to retracted positions, l. said chip breaker being so associated and positioned with respect to the cutting tool and the cutting tool recess that, when the cutting tool is brought into contact with the extended chip breaker, the cutting edge of the tool is properly centered with respect to the axis of the tool assembly as defined by the point of intersection of said axes, m. the chip breaker being retracted from its extended position for normal operation as a chip breaker.

* * * * *